Dec. 23, 1924.
C. G. JOHNSON
CAMERA
Filed Jan. 17, 1924
1,520,185
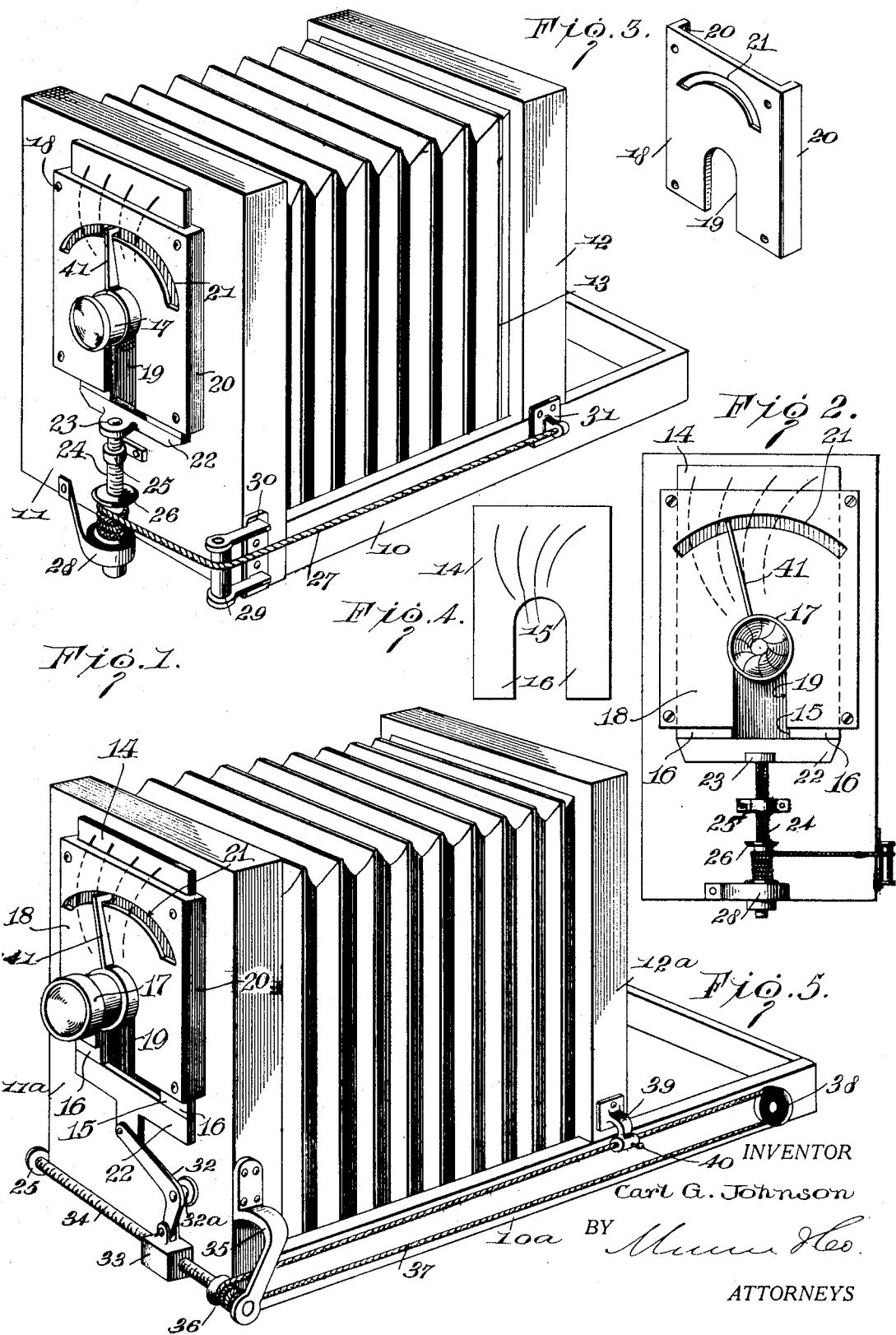
INVENTOR
Carl G. Johnson
BY
ATTORNEYS Patented Dec. 23, 1924.

1,520,185

UNITED STATES PATENT OFFICE.

CARL G. JOHNSON, OF EAU CLAIRE, WISCONSIN.

CAMERA.

Application filed January 17, 1924. Serial No. 686,836.

*To all whom it may concern:*

Be it known that I, CARL G. JOHNSON, a citizen of the United States, and a resident of Eau Claire, in the county of Eau Claire and State of Wisconsin, have invented certain new and useful Improvements in Cameras, of which the following is a specification.

My present invention relates generally to cameras and more particularly to cameras as used in process engraving and other copying work, having adjustable bellows and ordinarily utilized under constant uniform artificial light which requires for maximum success that the operator know the exact diaphragm opening and exposure time for the different positions to which the bellows may be extended, and my object is the provision of an automatic indicating device which will be shifted from one indicating position to another as the bellows is moved in shifting the plate holder forwardly or rearwardly.

A further object of my invention is the provision of a movable indicator of the character above described which may be readily applied to a camera already in use, which will be simple and inexpensive, which will add but little weight to the camera to which it is applied, and which will avoid any obstruction of the ordinary movement of the several parts of the camera for the usual purposes.

In the accompanying drawing which illustrates my present invention and forms a part of this specification, Figure 1 is a perspective view illustrating the practical application of my invention, Figure 2 is a front view of my invention, Figure 3 is a detail perspective view of the casing of the indicator, Figure 4 is a face view of the indicating member, and Figure 5 is a view illustrating a slightly modified form of the indicator actuating connections.

Referring now to these figures and particularly to Figures 1 to 4 inclusive my invention proposes a device for attachment to that type of camera used in process engraving and other copying work, of which I have shown a horizontal part 10 with the forward end of which the upright lens board 11 is rigid, the part 10 forming a horizontal slideway in which the plate holder 12 connected to the lens board 11 by the flexible bellows 13, is movable.

My invention proposes an indicator which as seen in Figure 4 may be in the form of a card or plate 14 having the desired indications along curved vertical lines 15 upon its upper portion, its lower portion having a vertical central slot adapting its lower side portion 16 to straddle the lens holder 17. This indicator may be mounted within a casing 18 shown in Figure 3, also slotted at its lower portion as at 19 so as to straddle the lens holder, having side flanges 20 holding the same spaced from the front surface of the lens board, which the side flanges 20 engage, a sufficient distance to insure free vertical movement of the indicating plate through the casing. This casing has a curved slot 21 thereacross through which the readings on the indicator plate may be readily observed.

According to the structure shown in Figures 1 and 2 the lower end of the indicating card or plate 14 is suitably attached to a lower cross rail 22 having intermediate its ends a forwardly outstanding lug 23 to which the upper end of a screw bar 24 is secured. This screw bar is vertically movable through a guide bracket 25 and its lower end below the bearing bracket 25 is threaded through a thimble or pulley 26 around which one end of the controlling cord or cable 27 is wrapped. The pulley 26 is held against vertical movement in connection with a spring casing 28 whose spring is adapted to turn the pulley 26 in one direction when the controlling cord or cable 27 is slacked. This pulley actuating cord or cable 27 extends transversely across a portion of the lower end of the lens board 11 and inwardly along one side of the camera frame around a guide roller 29 rotatably mounted within a bracket 30 at one lower corner of the lens board. At its rear end the controlling cord or cable 27 is attached to a bracket 31 rigidly outstanding from the plate holder 12, the parts being so associated that when the plate holder 12 is shifted rearwardly the pulley 26 will be rotated in one direction to shift the adjusting screw 24 and the indicator card or plate vertically in one direction, the spring within casing 28 serving as before stated to shift the adjusting screw and the indicator card or plate in the other direction when the plate holder 12 is shifted forwardly toward the lens board 11.

My invention is capable of certain variations including the construction shown in Figure 5, where the indicator card or plate is slidable vertically in its casing by virtue of the connection of a depending arm or its cross bar to one arm of a bell crank 32 fulcrumed as at 32ᵃ upon the lens board 11ᵃ. The opposite end of this bell crank is pivotally connected to a slide block 33 through which a screw shaft 34, mounted horizontally across the lower portion of the lens board within bearings 35, is threaded so that upon its rotation the slide block 33 will be shifted to the right or left, depending upon the direction of such rotation. Adjacent to one end where it projects laterally beyond the adjacent side of the lens board 11ᵃ, the screw shaft 34 is provided with a spool or pulley 36, and around this spool or pulley 36 an endless flexible actuating connection 37 is given several turns.

The flexible actuating connection above referred to extends along one side of the horizontal portion 10ᵃ of the camera frame and around a guide pulley 38 at the rear of said casing portion 10ᵃ. This flexible connection is engaged at a point between the guide pulley 38 and the screw shaft spool or pulley 36 by means of a bracket 39 attached to one lower side portion of the plate holder 12ᵃ, the bracket having an aperture through which the flexible connection passes and also having a set screw 40 by virtue of which the flexible connection is clamped thereto.

Aside from the operating connections, both forms of my invention as above described are capable of utilizing the same indicating cards or plates and the same casing in which these cards or plates are movable. It will also be observed that both forms of my invention may be readily applied to cameras now in use, that my invention is simple and inexpensive, adapted to operate with uniform efficiency, and will be lasting and durable in practice with reasonable care.

It will also be noted that the diaphragm in both forms of the invention, has an upstanding indicating arm 41 which projects angularly into the slot 21 of the casing so as to readily coact with the markings on the indicating plate in the various positions of the latter.

I claim:

1. In a camera having a front plate or lens holder and an adjustable rear plate holder and also having a lens and controlling diaphragm on the lens holder, a casing mounted on the lens holder having a sight aperture, a diaphragm indicator slidable in said casing, and means extending from the lens holder to the plate holder and controlled by adjustment of the latter for shifting the said indicator within said casing across the sight opening of the latter.

2. In a camera having a front plate or lens holder and an adjustable rear plate holder and also having a lens and controlling diaphragm on the lens holder, a casing mounted on the lens holder having a sight aperture, a diaphragm indicator slidable in said casing, an adjusting screw operatively connected to the said indicator, and means for actuating the screw to shift the said indicator controlled by adjustment of the said plate holder.

3. In a camera having a front plate or lens holder and an adjustable rear plate holder and also having a lens and controlling diaphragm on the lens holder, a casing mounted on the lens holder having a sight aperture, a diaphragm indicator slidable in said casing, an adjusting screw operatively connected to the said indicator, and means including a flexible connection for actuating said screw to shift the indicator, said flexible connection leading from the lens holder and attached to said plate holder.

4. In a camera having a lens and diaphragm and an adjustable plate holder, an indicator for the diaphragm movably mounted adjacent to the latter, an adjusting screw connected to said indicator, a pulley threaded on the screw, spring means for rotating the pulley in one direction to shift the screw lengthwise, and a flexible connection around the pulley for rotating the same in the opposite direction, said flexible connection being extended to and connected with the said plate holder.

CARL G. JOHNSON.